Nov. 12, 1935.  A. G. GUENTHER  2,020,640
CONTROL SYSTEM FOR MOTOR DRIVEN VEHICLES
Filed Feb. 13, 1933
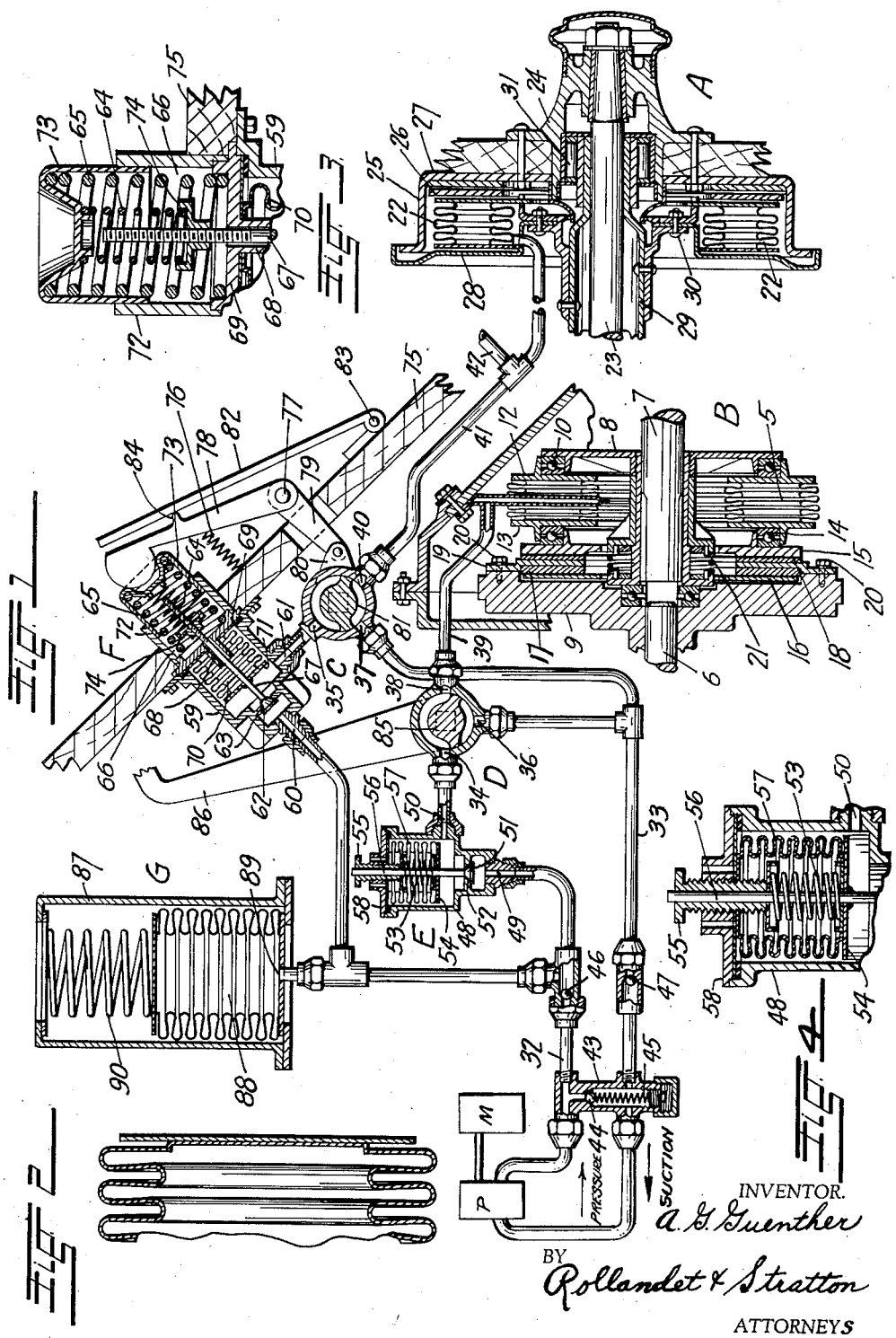
INVENTOR.
A. G. Guenther
BY
Rollandet & Stratton
ATTORNEYS Patented Nov. 12, 1935

2,020,640

UNITED STATES PATENT OFFICE 2,020,640

CONTROL SYSTEM FOR MOTOR-DRIVEN VEHICLES

Arthur G. Guenther, Denver, Colo., assignor to Therese M. Guenther, Denver, Colo.

Application February 13, 1933, Serial No. 656,511

7 Claims. (Cl. 60—52)

This invention relates to a control system for motor driven vehicles, its primary object being to provide an association of cooperative elements in which the expansive action of a compressible fluid is utilized to control the movement of a vehicle at the will of the driver.

A further object is to produce the above-stated result through the medium of a fluid-controlled clutch-element and fluid-controlled brake-elements.

Another object is to provide a system of the above-stated character operatable by liquid obtained from the oil pump included in the power plant of a motor-driven vehicle, and still further objects will be found in details of construction of the several elements and in novel arrangements and combinations of parts, as will be fully disclosed in the course of the following description, with reference to the accompanying drawing which illustrates in Figure 1, a partially sectional fragmentary elevation of the system, and in Figure 2, an enlarged sectional view of a pressure-sensitive device forming part of the principal elements of the system.

Figure 3 shows an enlarged sectional view of the spring-chamber of the variable pressure brake valve, and Figure 4, a sectional view of the spring-chamber of the clutch pressure-reducing valve.

The pressure sensitive elements are provided in the form of bellows, which are contracted or extended under varying pressures of a fluid supplied internally of the same.

Referring further to the drawing, a brake element of a motor-driven vehicle is shown at A and a clutch element of the vehicle is shown at B.

The element B has an annular bellows 5 between two members connected respectively with the engine shaft 6 and with the transmission shaft 7. The members between which the bellows is disposed are a disk 8 fast on the transmission shaft and a flywheel 9 on the engine shaft. The disk serves as an abutment for the bellows, through the medium of a ball-bearing 10 between the disk and an annular end plate 12 of the bellows, and the expansive movement of the bellows is communicated to the flywheel by means of an annular end-plate 13 at the opposite side of the bellows, a ball bearing 14, and disks 15 and 16 disposed to engage with friction faces 17 and 18 of an annular flange 19 bolted to the flywheel as at 20.

A coiled spring 21 normally holds the disks 15 and 16 apart.

The brake-element A has an annular bellows 22 acting upon a wheel of the vehicle and a relatively stationary part of the axle housing. The axle 23 inside the housing, carries the wheel 24 to which is attached the usual brake-drum 25.

In the present construction, the expansion-member 22 acts upon the vertical face of the drum, through the intermediary of an annular wear plate 26 and an annular lining 27 upon said face.

The expansion-member at the opposite side thereof, engages an abutment plate 28 secured to the stationary axle-housing 29 by means of bolts 30. A roller bearing 31 supports the wheel upon the housing. It is to be understood that in practice, two or four brake-elements of substantially identical construction are employed to arrest simultaneously the movement of two or four wheels of the vehicle. But one of the brake-elements has been shown in the drawing, it being but necessary to connect the expansion-members of the plurality of brake-elements with one and the same source of pressure-fluid.

The system for controlling the vehicle through the medium of the clutch-element and the brake-element hereinabove described, comprises in association therewith, a three-way valve C for the brake-element, a three-way valve D for the clutch-element, and a pressure pipe line 32 and a suction pipe-line 33 controlled by the valves.

The two lines 32 and 33 are connected with the delivery and intake ports respectively of a pump P, which, in an automobile, may be the oil pump of the engine or motor M.

The pressure-line connects with a port 34 of the clutch control valve D and with a port 35 of the brake-valve C.

The suction-line connects with a port 36 of the clutch-valve and with a port 37 of the brake valve. The third port 38 of the clutch control valve is connected with the bellows 12 of the clutch-element B, by means of a pipe 39 and the third port 40 of the brake-valve is connected with the bellows 22 of the several brake-elements by a pipe 41 and one or more branches 42.

Between the pump or other circulation element and the valves D and C, the two lines are connected by a by-pass in a head 43, which provides the means for connecting the pipes 32 and 33 and the circulation element. The by-pass is controlled by a check valve 44 which is yieldingly held in its closing position by a spring 45.

The return flow of pressure fluid through the pressure line is prevented by a check-valve 46, and a similar valve 47 prevents the adverse flow of fluid from the circulation element through the suction line.

Connected in the pressure line between the check valve and the clutch control valve is a clutch pressure reducing valve E, acting as a governor for pressure on said line and comprising a housing 48 having two ports 49 and 50 connected in the line. The reducing valve E serves to limit the pressure that can be applied to the clutch and thus guards against too sudden functioning of the clutch, thereby assuring smooth starting of the car or machine regardless of the pressure of the fluid supply. A valve 51 cooperates with a seat in a partition 52 to control communication between the two ports, a spring 53 acting upon the valve 51 through the medium of a collar 54, yieldingly opposes the pressure of fluid entering the housing through the port 49. The collar 54 which is fixed on the valve stem, functions as a diaphragm to control the movement of the valve 51.

A screw-gland 55 guides the valve stem 56 and at the same time provides an adjustable abutment for the spring, by means of which the pressure of the spring upon the valve may be regulated. A bellows 57 fastened between the collar and the thereto opposite end-plate 58 of the housing provides a fluid-tight enclosure for the spring and the inner portion of the gland.

Also connected in the pressure line between the check-valve and the brake-control valve, is a lap valve F controlling braking pressure on the brake-element, and which comprises a housing 59 having two ports 60 and 61 connected in the line. A valve 62 controlling communcation between the ports, is normally held upon its seat in a partition 63 by fluid-pressure against the pressure of spring 64 which is placed within spring 65 and both of which are located within a chamber 66 formed exteriorly of the housing.

The stem 67 of the valve extends through a sleeve 68 on the end-plate 69 of the housing and a bellows 70 fastened between said end-plate and a collar 71 fixed on the valve stem provides a fluid-tight enclosure for the gland. The collar 71, furthermore, functions as a diaphragm to move the valve 62 to its seat by fluid pressure.

The exterior chamber is provided by a cylindrical cup 72 on the end plate 69 and a thimble 73 slidably fitted in an end thereof. The coiled spring 65 extends between the end plate and the thimble to yieldingly oppose inward movement of the thimble, while the inner spring 64 extends between the thimble and an abutment-flange 74 on the valve stem. The portion of the stem exteriorly of the housing is screw-threaded and the abutment flange is mounted on the threaded portion, so that by adjustment of the flange, the pressure of the spring upon the valve may be regulated.

The variable pressure valve has been shown as being mounted beneath the foot-board 75 of a motor vehicle. A lever 78, yieldingly supported by a spring 76, is pivotally connected, as at 77, with a link 79 connected with the crank arm 80 of the rotary member 81 of the brake valve C. A brake-pedal 82 fulcrumed on the foot-board at 83, engages a ridge 84 on the lever 78, so that the driver by pressure of the foot may move the valve-member 81 from one position to another and subsequently open the valve 62 against the pressure of the springs 64 and 65.

The rotary member 85 of the clutch control valve D is moved from one position to another by means of the usual clutch pedal 86.

Connected in the pressure line between the check valve 46 and the elements E and F is a pressure maintaining reservoir G, comprising a housing 87 enclosing a bellows 88 connected in the pressure line, to receive pressure fluid admitted through an opening 89. A spring 90 yieldingly opposes the expanding movement of the bellows.

The bellows of the several elements comprised in the system may be made of flexible metal or other suitable material, and it will be apparent that while the bellows of the clutch-element, the brake-elements and the reservoir act as expansive media in the operation of the system, those of the pressure-reducing valve and the variable pressure-valve serve merely in the capacity of fluid-tight enclosures for movable parts of the valves.

The bellows in the main view of the drawing have been shown in single lines since the scale of the drawing does not permit of sectional shading. However, the construction of the bellows has been shown on a larger scale in Figure 2.

In the operation of the system, the bellows of the brake-elements are normally deflated by their connection with the suction line, the rotary member of the valve C being normally in a position in which the ports 37 and 40 are in communication. Under the same condition, the bellows of the clutch-element is inflated by its connection with the pressure line, the ports 34 and 38 of the valve D being normally in communication. In order to apply the brakes, the driver of the vehicle depresses the pedal 82, thereby causing the lever 78 and the link 79 to move the rotary member of the valve C to the position in which the ports 40 and 35 are in communication. The housing 59 is thus placed in connection with the pressure line at opposite sides of the valve 62. Further pressure upon the pedal 82 compresses the spring 64 of the element F by inward movement of the sliding thimble 73 against the resistance of the spring 65, thereby unseating the valve 62, which is normally retained in closed position by the pressure of the fluid against its end, with the result that the pressure line is placed in communication with the bellows of the brake-elements through the communicating ports 35 and 40 of the valve C. When the pressure is built up in the brake bellows beyond a predetermined point, its action upon the diaphragm 71 will again close the valve 62.

The tension of the spring 64 may be varied by adjustment of the flange 74 on the threaded valve rod 67. The expansive action of the brake-bellows may thus be regulated, and a gradual pressure may be exerted ranging from a few ounces to the full pressure of engine delivery.

It will be apparent that the expansion of the brake bellows will cause its sides to frictionally engage the lining on the end plate of the brake-drum and the plate 28 rigidly fastened to the stationary axle housing. It is a valuable feature of the brake construction that the bellows may be applied to wheels equipped with the ordinary internal expansion brake, by merely removing the latter from the drum.

When it is desired to release the clutch the rotary member of the valve D is reversed so as to bring the bellows of the clutch-element B, which normally is in the pressure line, in connection with the suction line. The deflation of the bellows releases the contact between the frictionally engaging parts of the clutch connected respectively with the engine shaft and the transmission shaft. The pressure reducing valve E serves to equalize the pressure in the clutch bellows. The valve 51 is normally open and closes at the desired pressure by the pressure of the fluid around the bellows and upon the diaphragm 54 against the pressure of the spring 53 with the final closing movement effected by pressure exerted on valve 51, thereby interrupting the connection between the bellows and the source of fluid-pressure.

The tension of the spring may be varied whereby to regulate the pressure to be maintained in the bellows.

The reservoir G is provided to build up and store pressure equal to that produced in the operation of the engine, so that both the brake-element and the clutch-element may be operated by fluid-pressure even when the engine is not in operation.

The bellows of the reservoir is normally in connection with the pressure line, and the spring 90 regulates the pressure in the bellows so as to close the check valve 46 when the auxiliary supply of pressure is being used. When the required pressure and suction are built up in the system, the by-pass in the head 43, maintains the forces in equilibrium.

What I claim and desire to secure by Letters Patent is:

1. In a control system for motor-driven apparatus, including a rotary element, the combination with a source of pressure-fluid having an outlet for fluid by pressure and an inlet for fluid by suction, of a device for controlling the movement of the rotary element by frictional engagement therewith, having pressure-sensitive expansible means, a pressure line connected with the outlet, a suction line connected with the inlet, a connection between said lines and the expansible means, a valve controlling said connection to selectively connect the expansible means in either line, an automatic pressure-regulating device including a spring-pressed valve for controlling the connection between the first-mentioned valve and the pressure-line, and a device common to both valves to move the same from one determinate position to another.

2. In a control system for motor-driven apparatus, including a rotary element, the combination with a source of pressure-fluid having an outlet for fluid by pressure and an inlet for fluid by suction, of a device for controlling the movement of the rotary element by frictional engagement therewith, having pressure-sensitive expansible means, a pressure line connected with the outlet, a suction line connected with the inlet, a connection between said lines and the expansible means, a valve for controlling said connection to selectively connect the expansible means in either line, an automatic pressure-regulating device including a spring-pressed valve controlling the connection between the first-mentioned valve and the pressure-line, and a device common to both valves to move the same consecutively from one determinate position to another.

3. In a control system for motor-driven apparatus, including a rotary element, the combination with a source of pressure-fluid having an outlet for fluid by pressure and an inlet for fluid by suction, of a device for controlling the movement of the rotary element by frictional engagement therewith, having pressure-sensitive expansible means, a pressure line connected with the outlet, a suction line connected with the inlet, a connection between said lines and the expansible means, a valve controlling said connection to selectively connect the expansible means in either line, an automatic pressure-regulating device including a spring-pressed valve for controlling the connection of the first-mentioned valve in the pressure line, and adapted to be subjected to the influence of the fluid in the pressure-line when the first mentioned valve is positioned to connect the pressure-sensitive expansible means with the pressure-line, and a device common to both valves to move the same from one determinate position to another.

4. In a control system for motor-driven apparatus, including a rotary element, a device for controlling the movement of said element by frictional engagement therewith, expansible means for moving said device into and out of engagement with said element respectively by the application and exhaust of fluid pressure, an element for the supplying of pressure to said expansible means and the removal of pressure therefrom by suction, a valve mechanism connected with said expansible means to connect the same with said pressure and suction element to alternately subject said expansible means to pressure and to suction, a suction line and a pressure line connecting the valve mechanism with the pressure and suction element, a pressure-regulating device included in the pressure line, said device having a valve controlling the flow of pressure-fluid to the valve mechanism, and means for the simultaneous movement of said valve and valve mechanism, whereby the expansible means is alternately subjected to the influence of pressure and suction by connection with the pressure and suction element.

5. In a control system for motor-driven apparatus, including a rotary element, a device for controlling the movement of said element by frictional engagement therewith, expansible means for moving said device into and out of engagement with said rotary element by the application or exhaust of fluid pressure, a fluid pump for the supply of pressure to said expansible means and the exhaust of pressure from said means by suction, a valve mechanism connected with said expansible means to connect the same with said pump to alternately subject said expansible means to pressure and to suction, a suction line and a pressure line connecting the valve with the pump, a pressure-regulating device included in the pressure line, said device having a valve controlling the flow of pressure-fluid to the valve mechanism, and means for the simultaneous movement of the valve and valve mechanism, whereby the expansible means is alternately subjected to the influence of pressure and suction by connection with the pump.

6. In a control system for motor-driven apparatus, including a rotary element, a device for controlling the movement of said rotary element by frictional engagement therewith, comprising a bellows and a wear plate carried by the bellows and movable into and out of engagement with the rotary element by the application or exhaust of fluid pressure, an element for the supply of pressure to said bellows and the exhaust of pressure therefrom by suction, a valve mechanism connected with said bellows to connect the same with said pressure and suction element to alternately subject the bellows to pressure and to suction, a suction line and a pressure line connecting the valve with the pressure and suction element, a pressure-regulating device included in the pressure line, said device having a valve controlling the flow of pressure-fluid to the first-mentioned valve mechanism, and means for the simultaneous movement of said valves, whereby the bellows is alternately subjected to the influence of pressure and suction by connection with the pressure and suction element.

7. In a control system for motor-driven apparatus, including a rotary element, a device for controlling the movement of said rotary element by frictional engagement therewith, expansible means for moving said device into and out of engagement with said rotary element by the application or exhaust of fluid pressure, a pump for the supply of pressure to said expansible means and the exhaust of pressure from said means by suction, a valve mechanism connected with said expansible means to connect the same with said pump to alternately subject said expansible means to pressure and to suction, a suction line and a pressure line connecting the valve with the pump, a pressure-regulating device in the pressure line including a lap valve controlling the flow of pressure fluid to the first mentioned valve, and means for the simultaneous movement of said valve mechanism and the lap valve, whereby the expansible means is alternately subjected to the influence of pressure and suction by connection with the pressure and suction element.

ARTHUR G. GUENTHER.